US011899889B2

(12) United States Patent
Xiang et al.

(10) Patent No.: US 11,899,889 B2
(45) Date of Patent: Feb. 13, 2024

(54) TOUCH DISPLAY PANEL AND ELECTRONIC DEVICE

(71) Applicant: BOE Technology Group Co., Ltd., Beijing (CN)

(72) Inventors: Dalin Xiang, Beijing (CN); Wenxiu Zhu, Beijing (CN); Zewen Bo, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/788,900

(22) PCT Filed: Aug. 4, 2021

(86) PCT No.: PCT/CN2021/110595
§ 371 (c)(1),
(2) Date: Jun. 24, 2022

(87) PCT Pub. No.: WO2022/062694
PCT Pub. Date: Mar. 31, 2022

(65) Prior Publication Data
US 2023/0031048 A1 Feb. 2, 2023

(30) Foreign Application Priority Data
Sep. 22, 2020 (CN) .......................... 202011005333.5

(51) Int. Cl.
*G06F 3/044* (2006.01)

(52) U.S. Cl.
CPC .......... *G06F 3/0443* (2019.05); *G06F 3/0445* (2019.05); *G06F 3/0446* (2019.05);
(Continued)

(58) Field of Classification Search
None
See application file for complete search history.

(56) References Cited

U.S. PATENT DOCUMENTS 11,016,592 B2    5/2021  Yin et al.
11,232,275 B2 *  1/2022  Bok ...................... G06F 3/0445
(Continued)

FOREIGN PATENT DOCUMENTS

CN    104898334 A  *  9/2015  ....... G02F 1/134309
CN    108196736 A     6/2018
(Continued)

*Primary Examiner* — Duane N Taylor, Jr.
(74) *Attorney, Agent, or Firm* — WHDA, LLP

(57) ABSTRACT

A touch display panel and an electronic device. The touch display panel includes: a substrate; a first touch electrode and a second touch electrode adjacent to each other, and both having a metal mesh structure, wherein the first touch electrode includes a first metal line extending toward the second touch electrode, the second touch electrode includes a second metal line extending toward the first touch electrode, the first metal line and the second metal line are disposed collinearly and are spaced apart from each other, the touch display panel further includes an insulated first optical compensation line disposed between the first metal line and the second metal line, the first optical compensation line is disposed collinearly with the first metal line and the second metal line, and both end portions of the first optical compensation line abut against the first metal line and the second metal line, respectively.

20 Claims, 14 Drawing Sheets

(52) U.S. Cl.
CPC .............. *G06F 2203/04111* (2013.01); *G06F 2203/04112* (2013.01)

(56) References Cited

U.S. PATENT DOCUMENTS

| | | | |
|---|---|---|---|
| 11,294,519 B2 * | 4/2022 | Ye | G06F 3/0448 |
| 2016/0266691 A1 * | 9/2016 | Jang | G06F 3/0446 |
| 2019/0129534 A1 * | 5/2019 | Chiang | G06F 3/0412 |
| 2020/0033976 A1 | 1/2020 | Yin et al. | |
| 2020/0210014 A1 * | 7/2020 | Oh | G06F 3/0446 |
| 2022/0317811 A1 * | 10/2022 | Wang | G06F 3/0446 |
| 2022/0342511 A1 | 10/2022 | Xiang et al. | |

FOREIGN PATENT DOCUMENTS

| | | | | |
|---|---|---|---|---|
| CN | 108984038 A | | 12/2018 | |
| CN | 110007810 A | | 7/2019 | |
| CN | 111123562 A | * | 5/2020 | ........... G02F 1/1323 |
| CN | 111638812 A | | 9/2020 | |
| CN | 111966249 A | | 11/2020 | |
| IN | 110989863 A | | 4/2020 | |
| KR | 20140081426 A | | 7/2014 | |

* cited by examiner

TOUCH DISPLAY PANEL AND ELECTRONIC DEVICE

CROSS REFERENCE TO RELATED APPLICATION(S)

This application is a Section 371 National Stage Application of International Application No. PCT/CN2021/110595, filed on Aug. 4, 2021, entitled "TOUCH DISPLAY PANEL AND ELECTRONIC DEVICE", which claims priority to Chinese Patent Application No. 202011005333.5 filed on Sep. 22, 2020, and the contents of which are incorporated herein by reference in their entirety.

TECHNICAL FIELD

The present disclosure relates to a field of touch technology, and in particular to a touch display panel and an electronic device.

BACKGROUND

At present, an electronic device with a touch function has been widely used in people's daily life, and a touch electrode using a metal mesh structure has characteristics of good electrical conductivity, high transmittance, etc.

SUMMARY

Some embodiments of the present disclosure provide a touch display panel, including:
 a substrate;
 a first touch electrode disposed on the substrate, the first touch electrode having a metal mesh structure; and
 a second touch electrode disposed on the substrate and adjacent to the first touch electrode, the second touch electrode having a metal mesh structure,
 wherein the first touch electrode includes a first metal line extending toward the second touch electrode, the second touch electrode includes a second metal line extending toward the first touch electrode, the first metal line and the second metal line are disposed collinearly and spaced apart from each other,
 the touch display panel further includes an insulated first optical compensation line disposed between the first metal line and the second metal line, the first optical compensation line is disposed collinearly with the first metal line and the second metal line, and both end portions of the first optical compensation line abut against the first metal line and the second metal line, respectively.

In some embodiments, the first touch electrode and the second touch electrode are made of a same metal material and disposed in a same layer, and an optical property of a material of the first optical compensation line is substantially the same as an optical property of the metal material.

In some embodiments, a width of the first optical compensation line, a width of the first metal line, and a width of the second metal line are substantially equal to each other.

In some embodiments, a thickness of the first optical compensation line, a thickness of the first metal line, and a thickness of the second metal line are substantially equal to each other.

In some embodiments, the touch display panel further includes:
 a floating electrode disposed on the substrate and adjacent to the first touch electrode, the floating electrode having a metal mesh structure,
 wherein the first touch electrode includes a third metal line extending toward the floating electrode, the floating electrode includes a fourth metal line extending toward the first touch electrode, the third metal line and the fourth metal line are disposed collinearly and spaced apart from each other by a predetermined distance,
 the touch display panel further includes an insulated second optical compensation line disposed between the third metal line and the fourth metal line, and the second optical compensation line is disposed collinearly with the third metal line and the fourth metal line, and both end portions of the second optical compensation line abut against the third metal line and the fourth metal line, respectively.

In some embodiments, the floating electrode is adjacent to the second touch electrode, the second touch electrode includes a fifth metal line extending toward the floating electrode, the floating electrode includes a sixth metal line extending toward the second touch electrode, the fifth metal line and the sixth metal line are disposed collinearly and spaced apart from each other by a predetermined distance,
 the touch display panel further includes an insulated third optical compensation line disposed between the fifth metal line and the sixth metal line, the third optical compensation line is disposed collinearly with the fifth metal line and the sixth metal line, and both end portions of the third optical compensation line abut against the fifth metal line and the sixth metal line, respectively.

In some embodiments, the first touch electrode includes:
 a first sub-portion extending in a first direction;
 a plurality of first finger-shaped portions extending away from the first sub-portion in a second direction intersecting the first direction from the first sub-portion, the plurality of first finger-shaped portions being located in one side of the first sub-portion; and
 a plurality of second finger-shaped portions extending away from the first sub-portion in the second direction from the first sub-portion, the plurality of second finger-shaped portions being located on the other side of the first sub-portion, and
 the second touch electrode includes a first touch sub-electrode and a second touch sub-electrode, wherein the first touch sub-electrode includes:
 a second sub-portion extending in the first direction, the second sub-portion being located on one side of the first sub-portion; and
 a plurality of third finger-shaped portions extending from the second sub-portion toward the first sub-portion in the second direction,
 the second touch sub-electrode includes:
 a third sub-portion extending in the first direction, the third sub-portion being located on the other side of the first sub-portion; and
 a plurality of fourth finger-shaped portions extending from the third sub-portion toward the first sub-portion in the second direction,
 wherein the plurality of first finger-shaped portions and the plurality of third finger-shaped portions are alternately disposed in the first direction, and the plurality of second finger-shaped portions and the plurality of fourth finger-shaped portions are alternately disposed in the first direction.

In some embodiments, the touch display panel further includes:
 a bridge portion extending in the second direction and configured to electrically connect the first touch sub-portion and the second touch sub-portion,
 wherein the bridge portion is located in a first electrode layer, the first touch electrode and the second touch electrode are located in a second electrode layer, and the first electrode layer and the second electrode layer are sequentially disposed away from the substrate.

In some embodiments, the bridge portion includes a first bridge sub-portion, a second bridge sub-portion and a third bridge sub-portion disposed sequentially in the second direction,
 an orthographic projection of the first bridge sub-portion on the substrate falls within an orthographic projection of at least one of the plurality of third finger-shaped portions on the substrate;
 an orthographic projection of the second bridge sub-portion on the substrate partially overlaps an orthographic projection of the first sub-portion on the substrate; and
 an orthographic projection of the third bridge sub-portion on the substrate falls within an orthographic projection of at least one of the plurality of fourth finger-shaped portions on the substrate.

In some embodiments, the second electrode layer has a first surface facing the first electrode layer, the first electrode layer has a second surface facing the second electrode layer, an insulating layer is sandwiched between the first surface and the second surface, and an orthographic projection of the first electrode layer on the substrate has an overlapping region with an orthographic projection of the second electrode layer on the substrate.

In some embodiments, in the overlapping region, at least one of the first surface and the second surface is a rough surface.

In some embodiments, in the overlapping region, at least one of the first surface and the second surface is coated with a black light absorbing material.

In some embodiments, the touch display panel further includes:
 a display pixel layer disposed on the substrate; and
 an encapsulation layer disposed on a side of the display pixel layer away from the substrate, and configured to cover the display pixel layer,
 wherein the first electrode layer and the second electrode layer are sequentially disposed away from the encapsulation layer.

In some embodiments, the first touch electrode and the second touch electrode form a touch unit, and the touch display panel includes a plurality of touch units arranged in an array, for two touch units adjacent in the first direction, first sub-portions of first touch electrodes of the two touch units are electrically connected to each other; for two touch units adjacent in the second direction, a second sub-portion of a first touch sub-electrode of a second touch electrode of one of the two touch units is electrically connected to a third sub-portion of a second touch sub-electrode of a second touch electrode of the other of the two touch units.

Some embodiments of the present disclosure provide an electronic device including the touch display panel according to the above-mentioned embodiments.

BRIEF DESCRIPTION OF THE DRAWINGS

The other features, objectives and advantages of the present disclosure will be clearer through the detailed description of non-limiting embodiments with reference to the following accompanying drawings, in which.

DETAILED DESCRIPTION OF EMBODIMENTS

Figure 1:
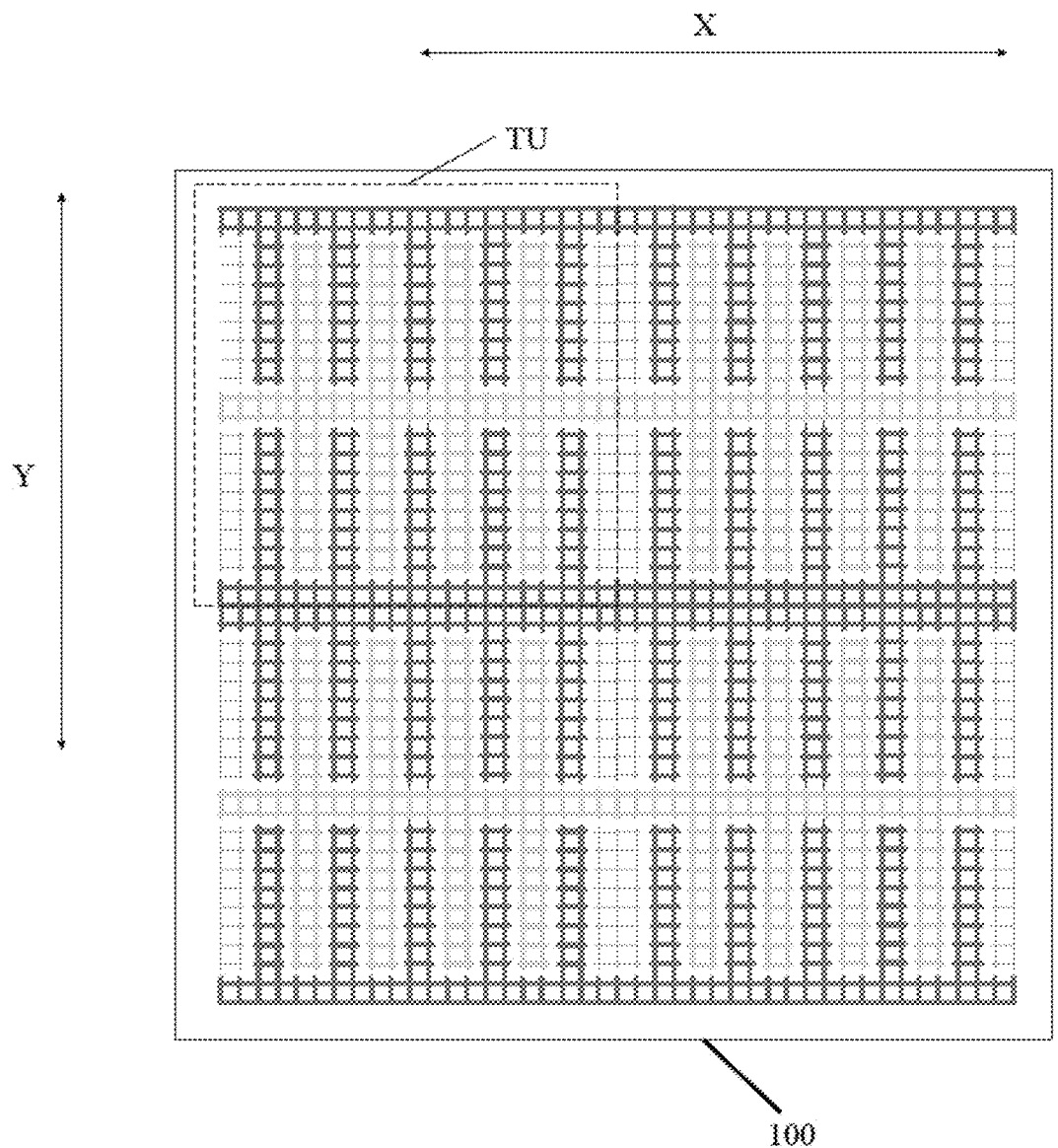
FIG. 1 shows a schematic diagram of planar electrodes of a touch display panel according to some embodiments of the present disclosure.

The present disclosure will be further described in detail below with reference to the accompanying drawings and embodiments. It should be understood that the specific embodiments described herein are only used to explain the related invention, but not intended to limit the present disclosure. In addition, it should be noted that, for the convenience of description, only parts related to the present disclosure are shown in the accompanying drawings.

It should be noted that embodiments of the present disclosure and the features of the embodiments may be combined with each other without a conflict.

Furthermore, in the following detailed description, for convenience of explanation, many specific details are set forth in order to provide a thorough understanding of the embodiments of the present disclosure. However, one or more embodiments may be implemented without these specific details.

It should be understood that, although the terms such as "first," "second," etc., may be used herein to describe different elements, these elements should not be limited by these terms. These terms are only used to distinguish one element from another. For example, a first element may be termed a second element, and, similarly, the second element may be termed the first element, without departing from the scope of example embodiments. As used herein, the term "and/or" includes any and all combinations of one or more of the associated listed items.

It should be understood that when an element or a layer is referred to as being "formed on" another element or layer, the element or layer may be directly or indirectly formed on the another element or layer. That is, for example, there may be an intermediate element or layer. In contrast, when an element or layer is referred to as being "formed directly on" another element or layer, there is no intermediate element or layer. Other words (e.g., "between" and "directly between", "adjacent" and "directly adjacent", etc.) used to describe the relationship between elements or layers should be interpreted in a similar manner.

The terms used in the present disclosure is for the purpose of describing particular embodiments only and is not intended to limit the embodiments. As used herein, a singular form is also intended to include a plural form unless the context clearly indicates otherwise. It will also be understood that when the terms "containing" and/or "including" are used herein, it is indicated that the features, integers, steps, operations, elements and/or components are present, but the presence or addition of one or more other features, integers, steps, operations, elements, components and/or combinations thereof is not excluded.

In the present disclosure, unless otherwise specified, the expressions "located in the same layer" and "disposed in the same layer" generally mean that a first part and a second part may use the same material and may be formed by the same patterning process. The expressions "located in different layers" and "disposed in different layers" generally mean that the first part and the second part are formed by different patterning processes.

The present disclosure provides a touch display panel, including: a substrate; a first touch electrode disposed on the substrate, the first touch electrode having a metal mesh structure; and a second touch electrode disposed on the substrate and adjacent to the first touch electrode, the second touch electrode having a metal mesh structure, wherein the first touch electrode includes a first metal line extending toward the second touch electrode, the second touch electrode includes a second metal line extending toward the first touch electrode, the first metal line and the second metal line are disposed collinearly and spaced apart from each other, the touch display panel further includes an insulated first optical compensation line disposed between the first metal line and the second metal line, the first optical compensation line is disposed collinearly with the first metal line and the second metal line, and both end portions of the first optical compensation line abut against the first metal line and the second metal line, respectively.

In some embodiments, the first touch electrode and the second touch electrode are made of a same metal material and disposed in a same layer, and an optical property of a material of the first optical compensation line is substantially the same as an optical property of the metal material.

In the present disclosure, an insulated optical compensation line, such as the first optical compensation line, is provided between the first touch electrode having a metal mesh structure and the second touch electrode having a metal mesh structure. The first optical compensation line connects a first metal line of the first touch electrode and a second metal line of the second touch electrode, so that the first touch electrode, the second touch electrode and the first optical compensation line form a complete mesh structure as a whole. As the optical properties of the material of the first optical compensation line are substantially the same as the optical properties of the metal material forming the first touch electrode and the second touch electrode, reflective properties of a mesh structure of the touch display panel at the first optical compensation line are substantially the same as reflective properties of mesh structures within the first touch electrode and the second touch electrode, so that the touch panel is displayed uniformly as a whole, and a poor display is avoided.

Some embodiments of the present disclosure provide a touch display panel, such as a touch display panel with an On-Cell electrode. FIG. 1 shows a schematic diagram of planar electrodes of a touch display panel according to some embodiments of the present disclosure. As shown in FIG. 1, the touch display panel includes a substrate 100 and a plurality of touch units TU arranged in an array on the substrate. FIG. 1 shows a 2×2 matrix of touch unit array for illustration. Those skilled in the art may understand that the touch unit array may be an array of m×n, wherein m≥2, and n≥2, may be equal or unequal.

Those skilled in the art may understand that the touch display panel further includes a display pixel layer between the substrate and the touch unit array, such as an OLED display electrode layer, an encapsulation layer, etc., thereby forming an On-Cell electrode. In FIG. 1, in order to clearly reflect electrodes of a touch array, structures such as the display pixel layer and the encapsulation layer are omitted.

Figure 2:
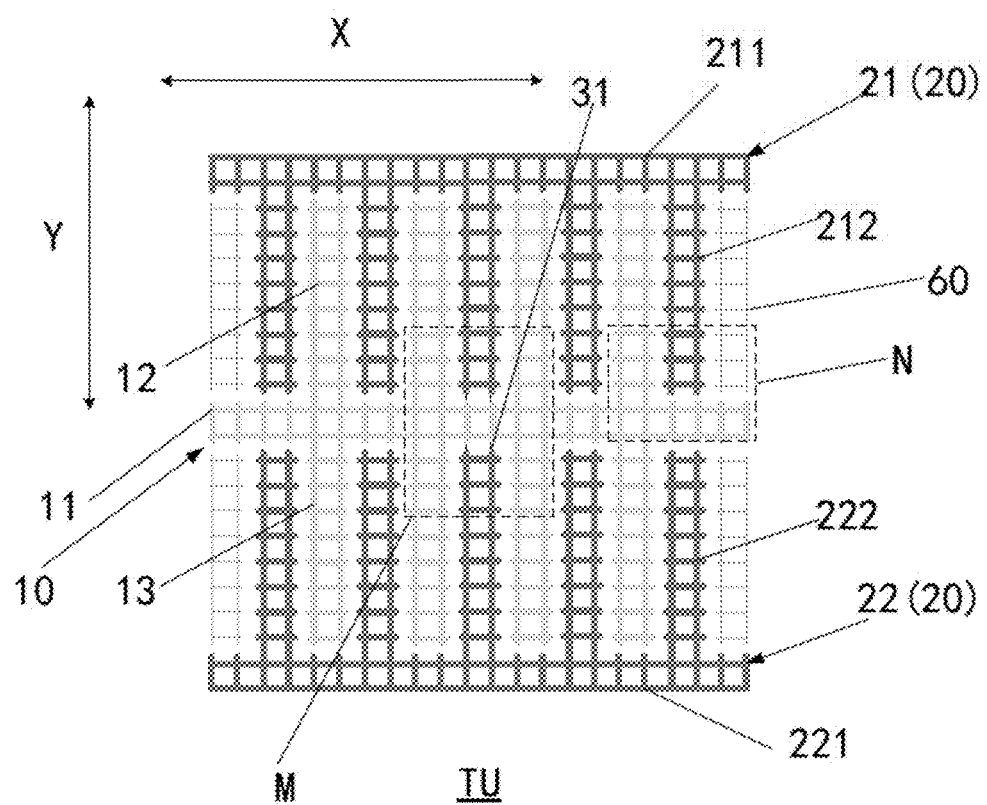
FIG. 2 shows a schematic diagram of electrodes of a single touch unit of the touch display panel shown in FIG. 1.

FIG. 2 shows a schematic diagram of electrodes of a single touch unit TU of the touch display panel shown in FIG. 1. As shown in FIG. 2, the touch unit TU includes a first touch electrode 10 and a second touch electrode 20. The first touch electrode 10 and the second touch electrode 20 both have metal mesh structures and are electrically insulated from each other.

Specifically, the first touch electrode 10 includes a first sub-portion 11, a plurality of first finger-shaped portions 12, and a plurality of second finger-shaped portions 13. The first sub-portion 11 extends in a first direction X. The plurality of first finger-shaped portions 12 extend away from the first sub-portion 11 in a second direction Y intersecting the first direction X from the first sub-portion 11, and the plurality of first finger-shaped portions 12 are located in one side of the first sub-portion 11, such as an upper side shown in FIG. 2. The plurality of second finger-shaped portions 13 extend away from the first sub-portion 11 in the second direction Y intersecting the first direction X from the first sub-portion 11, and the plurality of second finger-shaped portions 13 are located in the other side of the first sub-portion 11, such as a lower side shown in FIG. 2.

The second touch electrode 20 includes a first touch sub-electrode 21 and a second touch sub-electrode 22. The first touch sub-electrode 21 and the second touch sub-electrode 22 are respectively located on both sides of the first sub-portion 11. That is, as shown in FIG. 2, the first touch sub-electrode 21 is located on one side of the first sub-portion 11, such as the upper side shown in FIG. 2, and the second touch sub-electrode 22 is located on the other side of the first sub-portion 11, such as the lower side shown in FIG. 2. The first touch sub-electrode 21 includes a second sub-portion 211 and a plurality of third finger-shaped portions 212, the second sub-portion 211 extends in the first direction X, and the plurality of third finger-shaped portions 212 extend from the second sub-portion 211 toward the first sub-portion 11 in the second direction Y. The second touch sub-electrode 22 includes a third sub-portion 221 and a plurality of fourth finger-shaped portions 222, the third sub-portion 221 extends in the first direction X, and the plurality of fourth finger-shaped portions 222 extend from the third sub-portion 221 toward the first sub-portion 11 in the second direction Y.

In some embodiments, as shown in FIG. 2, the plurality of first finger-shaped portions 12 and the plurality of third finger-shaped portions 212 are alternately disposed in the first direction X, and the plurality of second finger-shaped portions 13 and the plurality of fourth finger-shaped portions 222 are alternately disposed in the first direction X.

In some embodiments, the first direction X and the second direction Y are perpendicular to each other.

In some embodiments, as shown in FIG. 2, the touch unit TU further includes a bridge portion 31, and the bridge portion 31 electrically connects the first touch sub-electrode 21 and the second touch sub-electrode 22. The bridge portion 31 extends, for example, in the second direction Y.

In some embodiments, the first and second touch electrodes 10 and 20 are made of a same material and disposed in a same layer, that is, the first touch electrode 10 and the second touch electrode 20 may be formed synchronously by a same patterning process. For example, both the first touch electrode 10 and the second touch electrode 20 are made of a same metal material, such as Al, Ag, Cu, etc. In some embodiments, the first touch electrode 10 and the second touch electrode 20 may be single-layer metal structures, or may be multi-layer metal structures, such as Ti—Al—Ti stacked metal structures. In some embodiments, the first touch electrode 10 and the second touch electrode 20 have a thickness in a range from 1 nm to 1000 nm. The bridge portion 31 and the first and second touch electrodes 10 and 20 are located in different layers, that is, the bridge portion 31 and the first and second touch electrodes 10 and 20 are formed by different patterning processes. The bridge portion 31 may also be made of a metal material such as Al, Ag, Cu, etc. In some embodiments, the bridge portion 31 may be a single-layer metal structure, or a multi-layer metal structure, such as a Ti—Al—Ti stacked metal structure. In some embodiments, the bridge portion 31 has a thickness in a range from 1 nm to 1000 nm.

As shown in FIG. 1 and FIG. 2, the first sub-portions 11 of the first touch electrodes 10 of any two adjacent touch units TU in the first direction X are electrically connected to each other, for example, the first sub-portions 11 of the first touch electrodes 10 are integrally formed. For any two adjacent touch units TU in the second direction Y, the second sub-portion 211 of the first touch sub-electrode 21 of the second touch electrode 20 of one touch unit TU is electrically connected to the third sub-portion 221 of the second touch sub-electrode 22 of the second touch electrode 20 of the other touch unit TU. For example, the second sub-portion 211 of the first touch sub-electrode 21 of the second touch electrode 20 of one touch unit TU is integrally formed with the third sub-portion 221 of the second touch sub-electrode 22 of the second touch electrode 20 of the other touch unit TU.

The first touch electrodes 10 of the plurality of touch units TU arranged in an array form a plurality of first touch electrode structures extending in the first direction X, and the second touch electrodes 20 of the plurality of touch units TU arranged in an array form a plurality of second touch electrode structures extending in the second direction Y. The first touch electrode structure is one of a touch driving electrode structure and a touch sensing electrode structure, and the second touch electrode structure is the other of the touch driving electrode structure and the touch sensing electrode structure.

Figure 3:
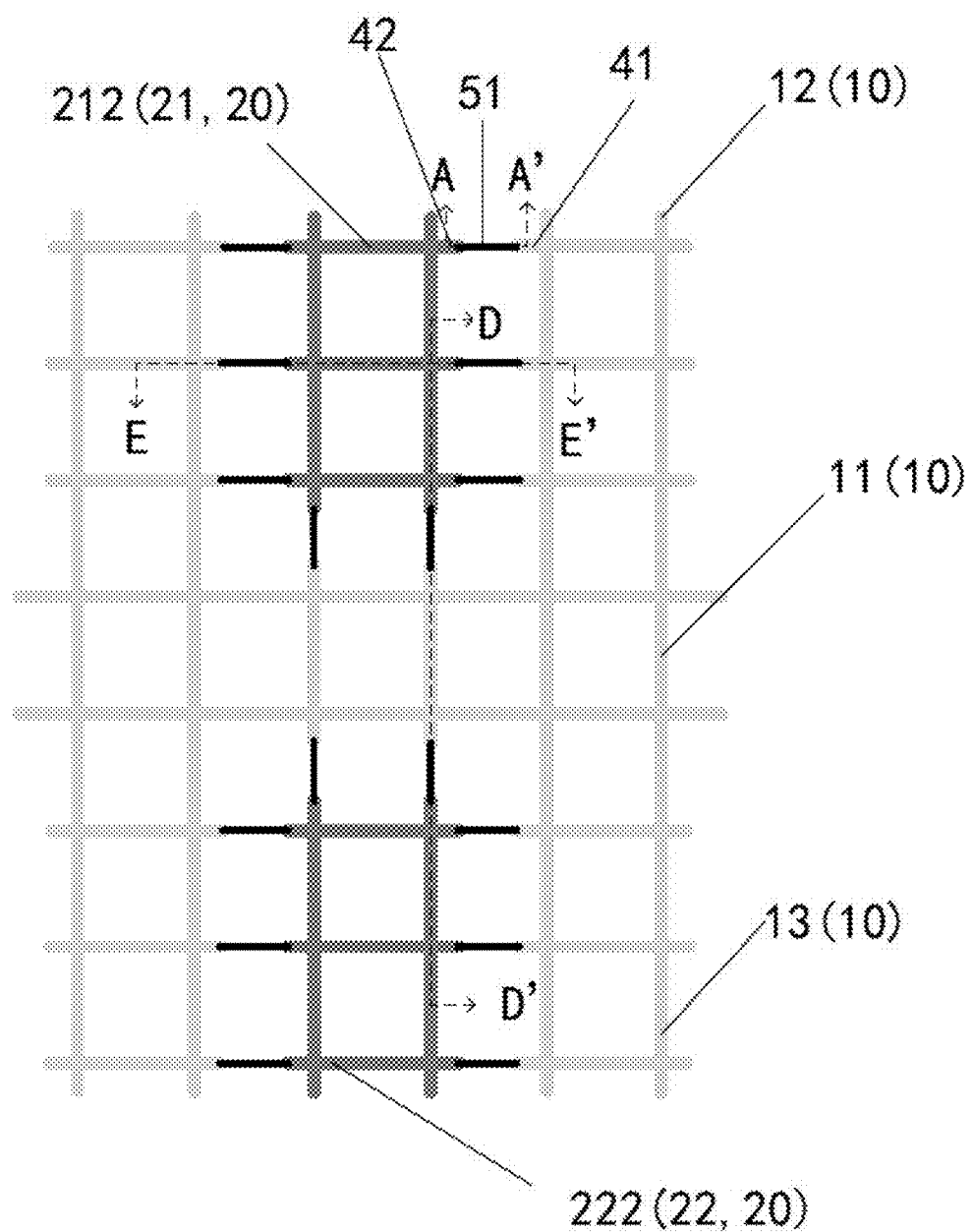
FIG. 3 shows an enlarged schematic diagram of a region M in FIG. 2.

FIG. 3 shows an enlarged schematic view of a region M in FIG. 2. As shown in FIG. 2 and FIG. 3, the first touch electrode 10 and the second touch electrode 20 are disposed adjacent to each other. For example, as shown in FIG. 3, the first sub-portion 11 and the first finger-shaped portions 12 of the first touch electrode 10 are adjacent to the third finger-shaped portions 212 of the first touch sub-electrode 21 of the second touch electrode 20, and the first sub-portion 11 and the second finger-shaped portions 13 of the first touch electrode 10 are adjacent to the fourth finger-shaped portions 222 of the second touch sub-electrode 22 of the second touch electrode 20.

As shown in FIG. 2 and FIG. 3, the first touch electrode 10 includes a first metal line 41 extending toward the second touch electrode 20, and the first metal line 41 is a part of the metal mesh structure of the first touch electrode 10. The second touch electrode 20 includes a second metal line 42 extending toward the first touch electrode 10, and the second metal line 42 is a part of the metal mesh structure of the second touch electrode 20. The first metal line 41 and the second metal line 42 are disposed collinearly and spaced apart from each other, that is, the first metal line 41 and the second metal line 42 are located on a same straight line with a predetermined distance therebetween. As the first touch electrode 10 and the second touch electrode 20 are made of the same material and disposed in the same layer, the first touch electrode 10 and the second touch electrode 20 may be understood as being formed by a continuous metal mesh structure being cut off at a boundary between the first touch electrode 10 and the second touch electrode 20; and the first metal line 41 and the second metal line 42 may be understood as being formed by a metal line of the continuous metal mesh structure being cut off at the boundary between the first touch electrode 10 and the second touch electrode 20.

In some embodiments, as shown in FIG. 3, the touch display panel further includes an insulated first optical compensation line 51, and the first optical compensation line 51 is disposed between the first metal line 41 and the second metal line 42. The optical compensation line 51 is disposed collinearly with the first metal line 41 and the second metal line 42, and both end portions of the first optical compensation line 51 abut against the first metal line 41 and the second metal line 42, respectively. That is, the first optical compensation line 51 is used to fill a gap between the first metal line 41 and the second metal line 42, so that the first touch electrode 10, the second touch electrode 20 and the first optical compensation line 51 form a continuous mesh structure. It may be understood that the first optical compensation line 51 is used to fill a truncated portion of the above-mentioned continuous metal mesh structure.

Optical properties of a material of the first optical compensation line 51 are substantially the same as optical properties of a metal material forming the first touch electrode 10 and the second touch electrode 20. Specifically, a difference in energy of reflected light between the material of the first optical compensation line 51 and the metal material forming the first touch electrode 10 and the second touch electrode 20 is less than 5%. In some embodiments, the material of the first optical compensation line 51 may be insulated barium sulfate, barium carbonate, calcium silicate, barium chloride, etc.

Those skilled in the art may understand that, in order to clearly show the gap between the first touch electrode 10 and the second touch electrode 20, the first optical compensation line 51 is omitted in FIG. 2.

Figure 5:
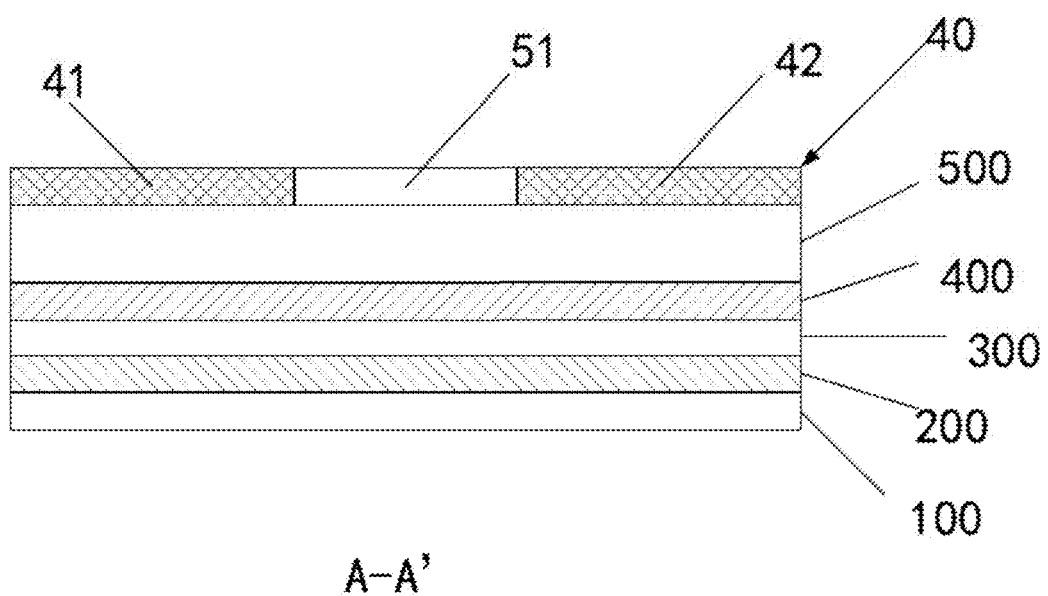
FIG. 5 shows a schematic cross-sectional view of a structure in FIG. 3 taken along A-A'.

FIG. 5 shows a schematic cross-sectional view of a structure in FIG. 3 taken along A-A'. As shown in FIG. 5, a display pixel layer 200, an encapsulation layer 300, a buffer layer 400 and an insulating layer 500 are arranged on the substrate 100 in sequence, and the display pixel layer 200 is, for example, an OLED display electrode layer. The insulating layer 500 is made of, for example, $SiN_x$, $SiO_2$ and other materials, and has a thickness in a range of, for example, 1 nm to 1000 nm. The first metal line 41 of the first touch electrode 10, the second metal line 42 of the second touch electrode 20 and the first optical compensation line 51 are disposed on a side of the insulating layer 500 away from the substrate 100.

In some embodiments, the second electrode layer 40 where the first touch electrode 10 and the second touch electrode 20 are located is located on the side of the insulating layer 500 away from the substrate 100, and a surface of the insulating layer 500 on a side away from the substrate 100 is flat, so that the first touch electrode 10 having the metal mesh structure and the second touch electrode 20 having the metal mesh structure have substantially the same reflective properties.

In some embodiments, as shown in FIG. 5, the first optical compensation line 51 fills the gap between the first metal line 41 and the second metal line 42, and a thickness of the first optical compensation line 51 is substantially the same as a thickness of the second electrode layer 40 where the first metal line 41 and second metal line 42 are located. A width of the first optical compensation line 51 is substantially the same as widths of the first metal line 41 and the second metal line 42, so that the first touch electrode 10, the second touch electrode 20 and the first optical compensation line 51 form a continuous and uniform mesh structure.

As described above, the first optical compensation line 51 is connected to the first metal line 41 of the first touch electrode 10 and the second metal line 42 of the second touch electrode 20, so that the first touch electrode 10, the second touch electrode 20 and the first optical compensation line 51 form a complete mesh structure as a whole. As the optical properties of the material of the first optical compensation line 51 are substantially the same as the optical properties of the metal material forming the first touch electrode 10 and the second touch electrode 20, reflective properties of a mesh structure of the touch display panel at the first optical compensation line 51 are substantially the same as reflective properties of mesh structures within the first touch electrode 10 and the second touch electrode 20, so that the touch panel is displayed uniformly as a whole, and a poor display is avoided.

As shown in FIG. 2, in some embodiments, the touch display panel further includes a floating electrode 60. The floating electrode 60 also has a metal mesh structure, which is disposed adjacent to the first touch electrode 10 and the second touch electrode 20, and the floating electrode 60 is not electrically connected to either of the first touch electrode 10 and the second touch electrode 20.

In some embodiments, the floating electrode 60 may be made of the same material and disposed in the same layer as the first touch electrode 10 and the second touch electrode 20. That is, the floating electrode 60 may be formed synchronously with the first touch electrode 10 and the second touch electrode 20 by the same patterning process. The floating electrodes 60 may also be formed synchronously by the same patterning process, and the floating electrode 60 is also located in the second electrode layer 40. For example, both are made of the same metal material, such as Al, Ag, Cu, etc. In some embodiments, the floating electrode 60 may be a single-layer metal structure, or may be a multi-layer metal structure, such as a Ti—Al—Ti stacked metal structure.

Figure 4:
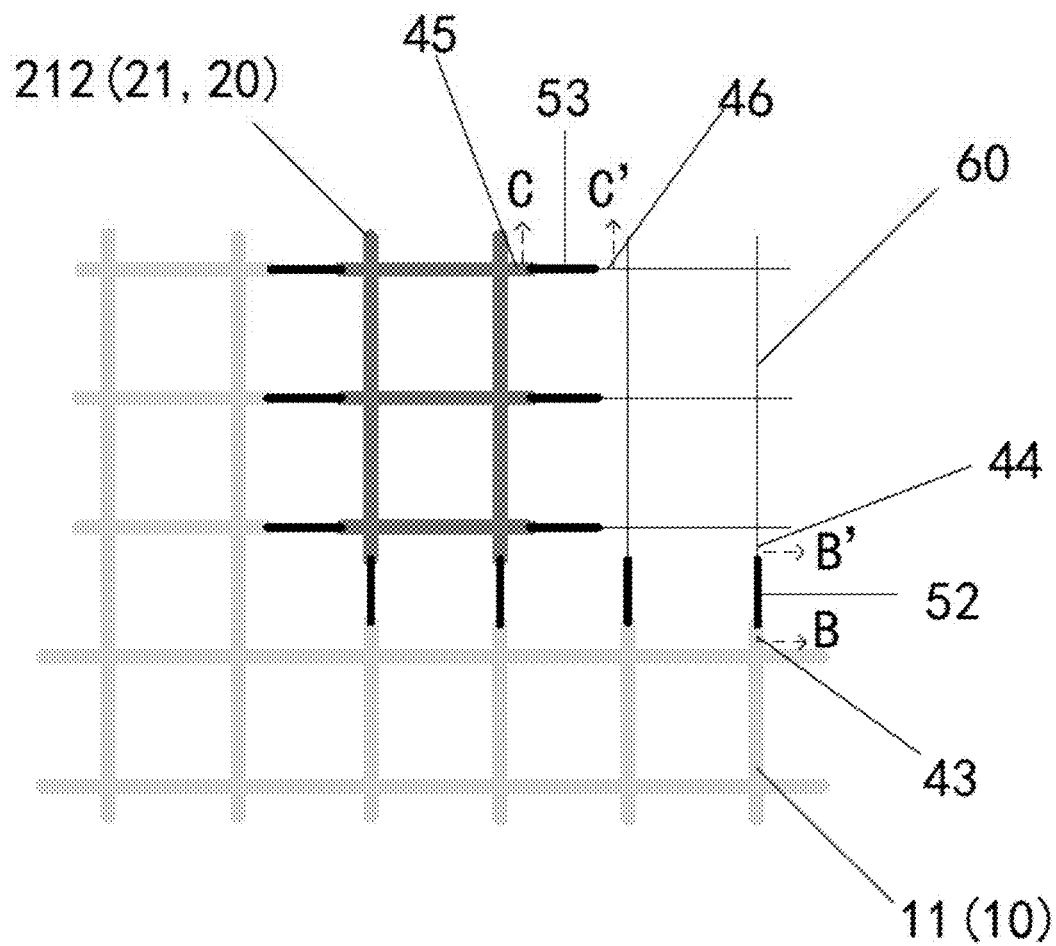
FIG. 4 shows an enlarged schematic diagram of a region N in FIG. 2.

FIG. 4 shows an enlarged schematic view of a region N in FIG. 2. As shown in FIG. 2 and FIG. 4, the first touch electrode 10 is disposed adjacent to the floating electrode 60. For example, as shown in FIG. 4, the first sub-portion 11 of the first touch electrode 10 is disposed adjacent to the floating electrode 60.

As shown in FIG. 2 and FIG. 4, the first touch electrode 10 includes a third metal line 43 extending toward the floating electrode 60, and the third metal line 43 is a part of the metal mesh structure of the first touch electrode 10. The floating electrode 60 includes a fourth metal line 44 extending toward the first touch electrode 10, and the fourth metal line 44 is a part of the metal mesh structure of the floating electrode 60. The third metal line 43 and the fourth metal line 44 are disposed collinearly and spaced apart from each other, that is, the third metal line 43 and the fourth metal line 44 are located on the same straight line with a predetermined distance therebetween. As the first touch electrode 10 and the floating electrode 60 are formed of the same material and located in the same layer, the first touch electrode 10 and the floating electrode 60 may be understood as being formed by a continuous metal mesh structure being cut off at a boundary between the first touch electrode 10 and the floating electrode 60; and the third metal line 43 and the fourth metal line 44 may be understood as being formed by a metal line of the continuous metal mesh structure being cut off at the boundary between the first touch electrode 10 and the floating electrode 60.

In some embodiments, as shown in FIG. 4, the touch display panel further includes an insulated second optical compensation line 52, and the second optical compensation line 52 is disposed between the third metal line 43 and the fourth metal line 44. The second optical compensation line 52 is disposed collinearly with the third metal line 43 and the fourth metal line 44, and both end portions of the second optical compensation line 52 abut against the third metal line 43 and the fourth metal line 44, respectively. That is, the second optical compensation line 52 is used to fill a gap between the third metal line 43 and the fourth metal line 44, so that the first touch electrode 10, the floating electrode 60 and the second optical compensation line 52 form a continuous mesh structure. It may be understood that the second optical compensation line 52 is used to fill a truncated portion of the above-mentioned continuous metal mesh structure.

Optical properties of a material of the second optical compensation line 52 are substantially the same as optical properties of a metal material forming the first touch electrode 10 and the floating electrode 60. Specifically, a difference in energy of reflected light between the material of the second optical compensation line 52 and the metal material forming the first touch electrode 10 and the floating electrode 60 is less than 5%. In some embodiments, the material of the second optical compensation line 52 may be insulated barium sulfate, barium carbonate, calcium silicate, barium chloride, etc.

Those skilled in the art may understand that, in order to clearly show the gap between the first touch electrode 10 and the floating electrode 60, the second optical compensation line 52 is omitted in FIG. 2.

Figure 6:
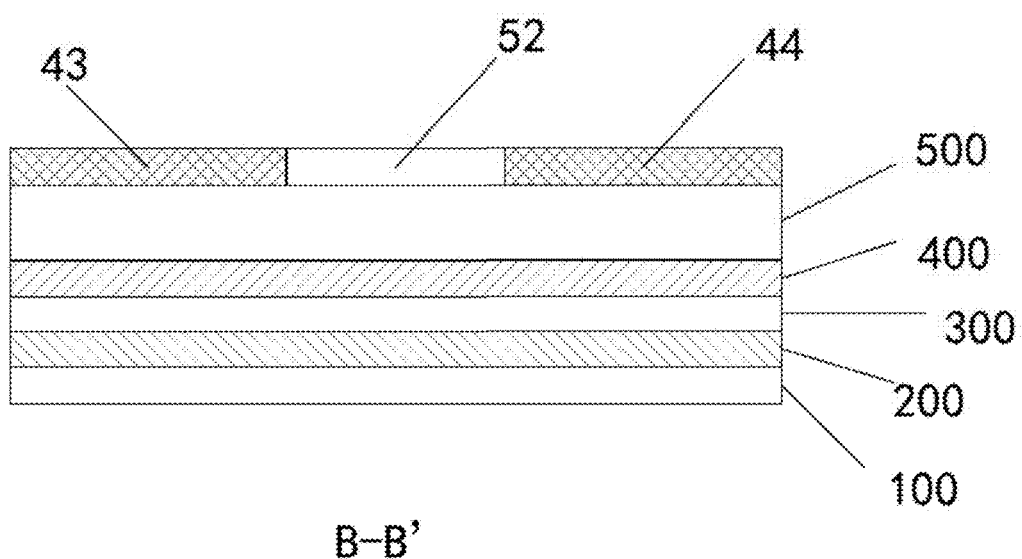
FIG. 6 shows a schematic cross-sectional view of the structure in FIG. 5 taken along B-B'.

FIG. 6 shows a schematic cross-sectional view of the structure in FIG. 4 taken along B-B'. As shown in FIG. 6, the display pixel layer 200, the encapsulation layer 300, the buffer layer 400 and the insulating layer 500 are arranged on the substrate 100 in sequence, and the display pixel layer 200 is, for example, an OLED display electrode layer. The third metal line 43 of the first touch electrode 10, the fourth metal line 44 of the floating electrode 60, and the second optical compensation line 52 are disposed on a side of the insulating layer 500 away from the substrate 100.

In some embodiments, the second electrode layer 40 where the first touch electrode 10 and the floating electrode 60 are located is located on the side of the insulating layer 500 away from the substrate 100, and a surface of the insulating layer 500 on a side away from the substrate 100 is flat, so that the first touch electrode 10 having the metal mesh structure and the floating electrode 60 having the metal mesh structure have substantially the same reflective properties.

In some embodiments, as shown in FIG. 6, the second optical compensation line 52 fills the gap between the third metal line 43 and the fourth metal line 44, and a thickness of the second optical compensation line 52 is substantially the same as the thickness of the second electrode layer 40 where the third metal line 43 and the fourth metal line 44 are located. A width of the second optical compensation line 52 is substantially the same as widths of the third metal line 43 and the fourth metal line 44, so that the first touch electrode 10, the floating electrode 60 and the second optical compensation line 52 form a continuous and uniform mesh structure.

In some embodiments, as shown in FIG. 2 and FIG. 4, the second touch electrode 20 is disposed adjacent to the floating electrode 60. For example, as shown in FIG. 4, the third finger-shaped portion 212 of the second touch electrode 20 is disposed adjacent to the floating electrode 60.

As shown in FIG. 2 and FIG. 4, the second touch electrode 20 includes a fifth metal line 45 extending toward the floating electrode 60, and the fifth metal line 45 is a part of the metal mesh structure of the second touch electrode 20. The floating electrode 60 includes a sixth metal line 46 extending toward the second touch electrode 20, and the sixth metal line 46 is a part of the metal mesh structure of the floating electrode 60. The fifth metal line 45 and the sixth metal line 46 are disposed collinearly and spaced apart from each other, that is, the fifth metal line 45 and the sixth metal line 46 are located on the same straight line with a predetermined distance therebetween. As the second touch electrode 20 and the floating electrode 60 are made of a same material and disposed in a same layer, the second touch electrode 20 and the floating electrode 60 may be understood as being formed by a continuous metal mesh structure being cut off at a boundary between the second touch electrode 20 and the floating electrode 60; and the fifth metal line 45 and the sixth metal line 46 may be understood as being formed by a metal line of the continuous metal mesh structure being cut off at the boundary between the second touch electrode 20 and the floating electrode 60.

In some embodiments, as shown in FIG. 4, the touch display panel further includes an insulated third optical compensation line 53, and the third optical compensation line 53 is disposed between the fifth metal line 45 and the sixth metal line 46. The third optical compensation line 53 is disposed collinearly with the fifth metal line 45 and the sixth metal line 46, and both end portions of the third optical compensation line 53 abut against the fifth metal line 45 and the sixth metal line 46, respectively. That is, the third optical compensation line 53 is used to fill a gap between the fifth metal line 45 and the sixth metal line 46, so that the second touch electrode 20, the floating electrode 60 and the third optical compensation line 53 form a continuous mesh structure. It may be understood that the third optical compensation line 53 is used to fill a truncated portion of the above-mentioned continuous metal mesh structure.

Optical properties of a material of the third optical compensation line 53 are substantially the same as optical properties of a metal material forming the second touch electrode 20 and the floating electrode 60. Specifically, a difference in energy of reflected light between the material of the third optical compensation line 53 and the metal material forming the second touch electrode 20 and the floating electrode 60 is less than 5%. In some embodiments, the material of the third optical compensation line 53 may be insulated barium sulfate, barium carbonate, calcium silicate, barium chloride, etc.

Those skilled in the art may understand that, in order to clearly show the gap between the second touch electrode 20 and the floating electrode 60, the third optical compensation line 53 is omitted in FIG. 2.

Figure 7:
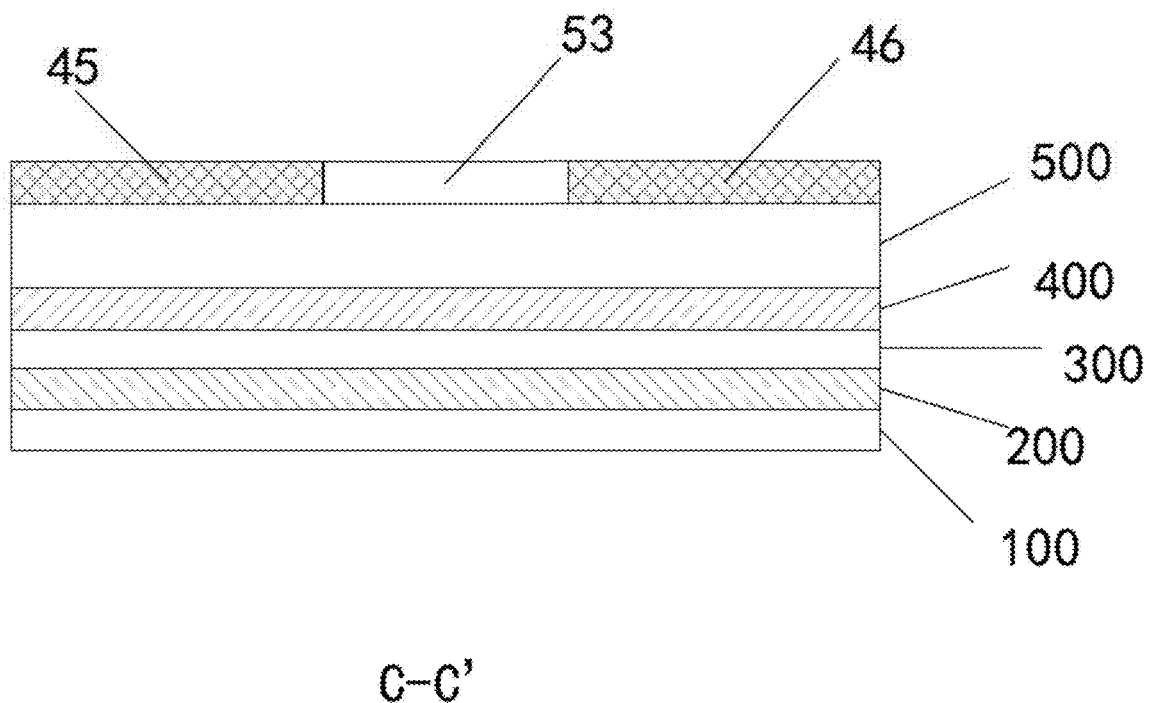
FIG. 7 shows a schematic cross-sectional view of the structure in FIG. 5 taken along C-C'.

FIG. 7 shows a schematic cross-sectional view of the structure in FIG. 4 taken along C-C'. As shown in FIG. 7, the display pixel layer 200, the encapsulation layer 300, the buffer layer 400 and the insulating layer 500 are arranged on the substrate 100 in sequence. The display pixel layer 200 is, for example, an OLED display electrode layer. The fifth metal line 45 of the second touch electrode 20, the sixth metal line 46 of the floating electrode 60, and the third optical compensation line 53 are disposed on a side of the insulating layer 500 away from the substrate 100.

In some embodiments, the second electrode layer 40 where the second touch electrode 20 and the floating electrode 60 are located is located on the side of the insulating layer 500 away from the substrate 100, and a surface of the insulating layer 500 on a side away from the substrate 100 is flat, so that the second touch electrode 20 having the metal mesh structure and the floating electrode 60 having the metal mesh structure have substantially the same reflective properties.

In some embodiments, as shown in FIG. 7, the third optical compensation line 53 fills the gap between the fifth metal line 45 and the sixth metal line 46, and a thickness of the third optical compensation line 53 is substantially the same as the thickness of the second electrode layer 40 where the fifth metal line 45 and the sixth metal line 46 are located. A width of the third optical compensation line 53 is substantially the same as widths of the fifth metal line 45 and the sixth metal line 46, so that the second touch electrode 20, the floating electrode 60 and the third optical compensation line 53 form a continuous and uniform mesh structure.

In some embodiments, the first optical compensation line 51, the second optical compensation line 52, and the third optical compensation line 53 are collectively referred to as optical compensation lines, which are used to connect metal disconnections between the first touch electrode 10, the second touch electrode 20, and the floating electrode 60, so that the first touch electrode 10, the second touch electrode 20, the floating electrode 60 form a complete mesh structure as a whole with the optical compensation lines. As optical properties of materials of the optical compensation lines are substantially the same as optical properties of the metal material forming the first touch electrode 10, the second touch electrode 20 and the floating electrode 60, reflective properties of mesh structures of the touch display panel at the optical compensation lines are substantially the same as reflective properties of mesh structures within the first touch electrode 10, the second touch electrode 20 and the floating electrode 60, so that the touch panel is displayed uniformly as a whole, and a poor display is avoided.

Figure 8:
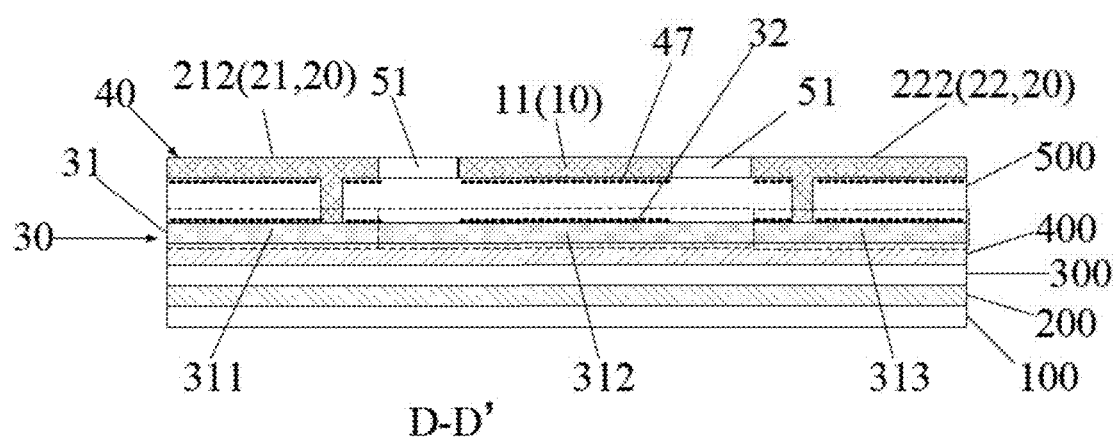
FIG. 8 shows a schematic cross-sectional view of the structure in FIG. 3 taken along D-D'.
Figure 9:
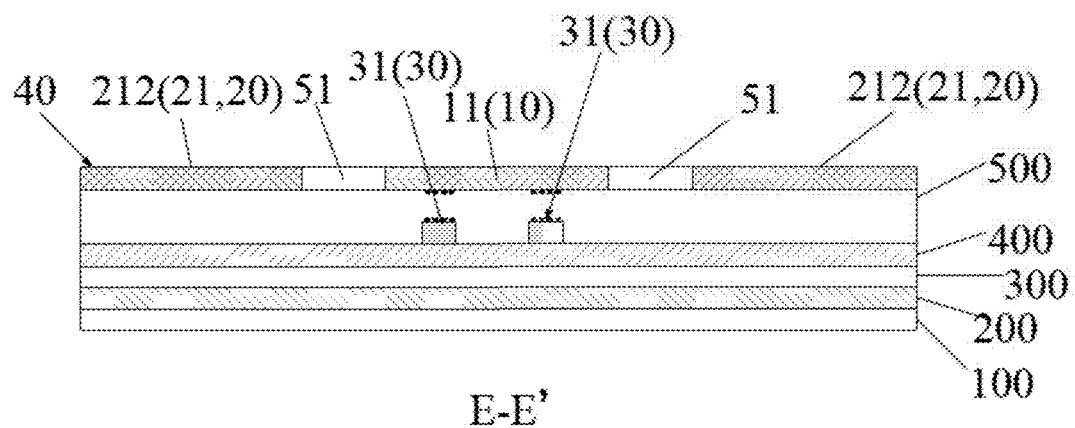
FIG. 9 shows a schematic cross-sectional view of the structure in FIG. 3 taken along E-E'.

FIG. 8 shows a schematic cross-sectional view of the structure in FIG. 3 taken along D-D', and FIG. 9 shows a schematic cross-sectional view of the structure in FIG. 3 taken along E-E'. As shown in FIG. 2, FIG. 3, FIG. 8 and FIG. 9, the bridge portion 31 extends in the second direction Y, and is used to electrically connect the first touch sub-portion 21 and the second touch sub-portion 22. Specifically, the bridge portion 31 is located in the first electrode layer 30, and the second electrode 30 is closer to the substrate 100 than the second electrode layer 40 where the first touch electrode 10, the second touch electrode 20 and the floating electrode 60 are located. The insulating layer 500 is disposed between the second electrode layer 40 and the first electrode layer 30. The bridge electrode 31 is electrically connected to the third finger-shaped portion 212 and the fourth finger-shaped portion 222 respectively through via holes passing through the insulating layer 500, where the third finger-shaped portion 212 and the fourth finger-shaped portion 222 are separated by the first sub-portion 11 and are opposite to each other. The bridge portion 31 includes a first bridge sub-portion 311, a second bridge sub-portion 312 and a third bridge sub-portion 313 that are sequentially arranged in the second direction Y. Specifically, the first bridge sub-portion 311 is electrically connected to the above-mentioned third finger-shaped portion 212 through the via hole passing through the insulating layer 500, and the third bridge sub-portion 313 is electrically connected to the above-mentioned fourth finger-shaped portion 222 through the via hole passing through the insulating layer 500. An orthographic projection of the first bridge sub-portion 311 on the substrate 100 falls within an orthographic projection of the third finger-shaped portion 212 on the substrate 100, an orthographic projection of the third bridge sub-portion 313 on the substrate 100 falls within an orthographic projection of the fourth finger-shaped portion 222 on the substrate 100, and an orthographic projection of the second bridge sub-portion 312 on the substrate 100 partially overlaps an orthographic projection of the first sub-portion 11 on the substrate 100. Those skilled in the art may understand that lines of the bridge portion 31 falling into a complete mesh structure formed by the first touch electrode 10, the second touch electrode 20, the floating electrode 60 and the optical compensation lines as a whole overlap each other, and do not overlap a hollow region of the complete mesh structure.

In some embodiments, as shown in FIG. 2, FIG. 3, FIG. 8 and FIG. 9, the bridge portion 31 may include a plurality of parallel metal lines extending in the second direction Y, for example, two parallel metal lines are included.

Figure 10:
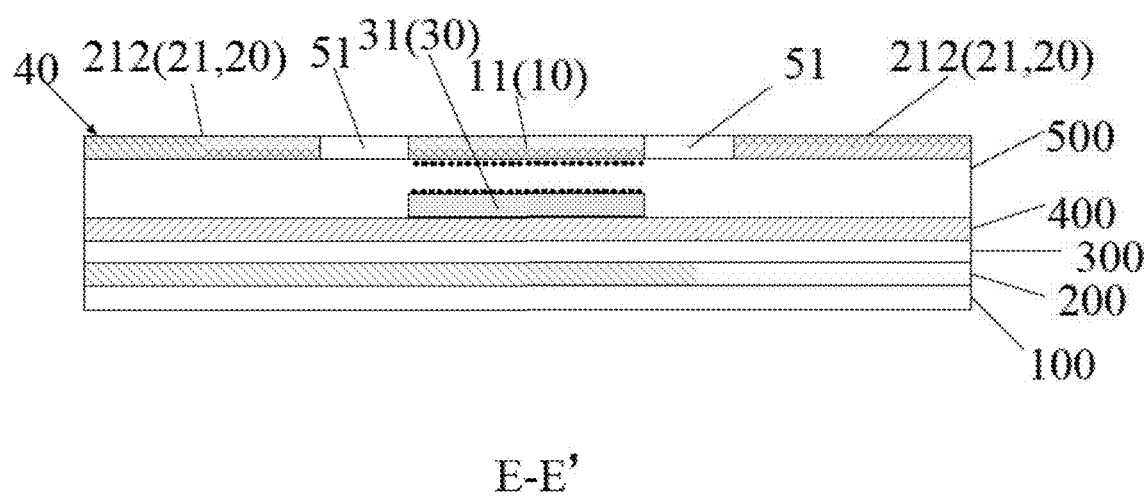
FIG. 10 shows a schematic cross-sectional view of the structure in FIG. 3 taken along E-E'.

In other embodiments, FIG. 10 shows a schematic cross-sectional view of the structure shown in FIG. 3 taken along E-E'. A difference between the embodiment shown in FIG. 10 and the embodiment shown in FIG. 9 is that the bridge portion 31 is a mesh-like structure extending in the second direction Y. In this embodiment, the orthographic projection of the first bridge sub-portion 311 on the substrate 100 may coincide with the orthographic projection of the third finger-shaped portion 212 on the substrate 100, and the orthographic projection of the third bridge sub-portion 313 on the substrate 100 may coincide with the orthographic projection of the fourth finger-shaped portion 222 on the substrate 100.

In some embodiments, the second electrode layer 40 has a first surface 47 facing the first electrode layer 30, the first electrode layer 30 has a second surface 32 facing the second electrode layer 40, and the insulating layer 500 is disposed between the first surface 47 and the second surface 32. An orthographic projection of the first electrode layer 30 on the substrate 100 has an overlapping region with an orthographic projection of the second electrode layer 40 on the substrate 100. In the overlapping region, at least one of the first surface 47 and the second surface 32 is a rough surface. As shown in FIG. 8 and FIG. 9, in the overlapping region, both the first surface 47 and the second surface 32 are rough surfaces. The rough surfaces may be formed by particle bombardment, laser bombardment or patterning. Therefore, in the overlapping region, light entering between the second electrode layer 40 and the first electrode layer 30 through the hollow region of the complete mesh structure formed by the first touch electrode 10, the second touch electrode 20, the floating electrode 60 and the optical compensation lines as a whole is diffusely reflected on the first surface 47 and the second surface 32, so that a formation of a resonant cavity between the second electrode layer 40 and the first electrode layer 30 is avoided, a uniform display on the touch panel as a whole is ensured, and a poor display is avoided.

In other embodiments, the first surface 47 of the second electrode layer 40 facing the first electrode layer 30 may be completely roughened, and the second surface 32 of the first electrode layer 30 facing the second electrode layer 40 may also be completely roughened.

Figure 11:
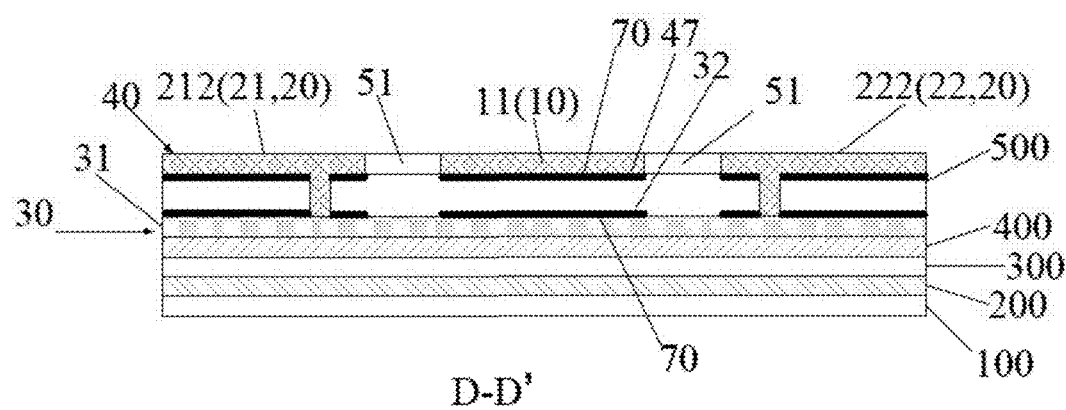
FIG. 11 shows a schematic cross-sectional view of the structure in FIG. 3 taken along D-D'.
Figure 12:
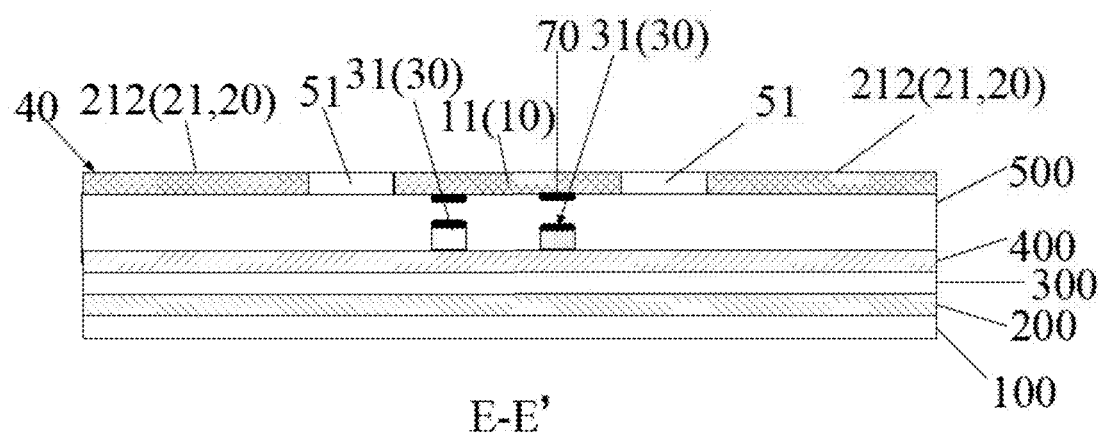
FIG. 12 shows a schematic cross-sectional view of the structure in FIG. 3 taken along E-E'.
Figure 13:
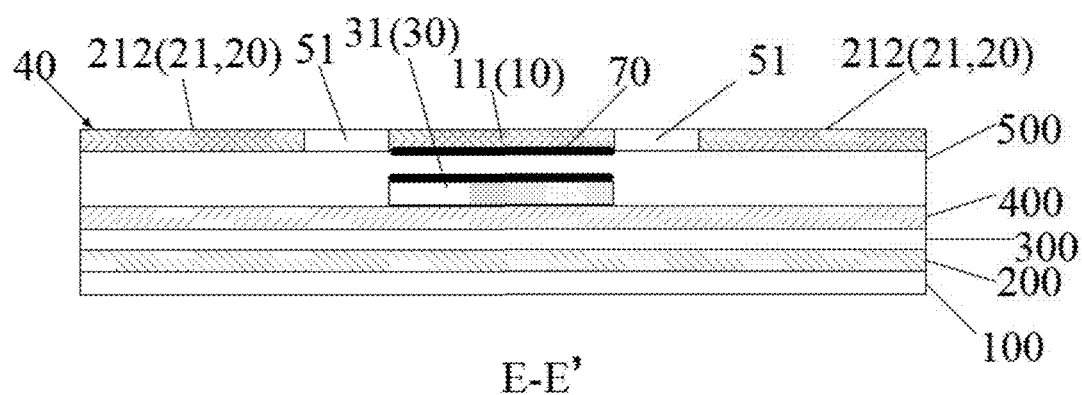
FIG. 13 shows a schematic cross-sectional view of the structure in FIG. 3 taken along E-E'.

In some embodiments, FIG. 11 shows a schematic cross-sectional view of the structure in FIG. 3 taken along D-D', FIG. 12 shows a schematic cross-sectional view of the structure in FIG. 3 taken along E-E', and FIG. 13 shows a schematic cross-sectional view of the structure in FIG. 3 taken along E-E'. FIG. 11 to FIG. 13 correspond to FIG. 8 to FIG. 10, respectively. Different from the embodiments corresponding to FIG. 8 to FIG. 10, as shown in FIG. 11 to FIG. 13, the second electrode layer 40 has a first surface 47 facing the first electrode layer 30, the first electrode layer 30 has a second surface 32 facing the second electrode layer 40, and the insulating layer 500 is disposed between the first surface 47 and the second surface 32. The orthographic projection of the first electrode layer 30 on the substrate 100 has an overlapping region with the orthographic projection of the second electrode layer 40 on the substrate 100. In the overlapping region, at least one of the first surface 47 and the second surface 32 is coated with a black light absorbing material 70. That is, in the overlapping region, the black light absorbing material 70 constitutes a black light absorbing layer which is disposed between the first surface 47 and the insulating layer 500 and/or between the second surface 32 and the insulating layer 500. As shown in FIG. 11 to FIG. 13, in the overlapping region, both the first surface 47 and the second surface 32 are coated with the black light absorbing material 70. Therefore, in the overlapping region, light entering between the second electrode layer 40 and the first electrode layer 30 through the hollow region of the complete mesh structure formed by the first touch electrode 10, the second touch electrode 20, the floating electrode 60 and the optical compensation lines as a whole is absorbed on the first surface 47 and the second surface 32, so that a formation of a resonant cavity between the second electrode layer 40 and the first electrode layer 30 is avoided, a uniform display on the touch panel as a whole is ensured, and a poor display is avoided.

In other embodiments, the first surface 47 of the second electrode layer 40 facing the first electrode layer 30 may be entirely coated with a black light absorbing material, and the second surface 32 of the first electrode layer 30 facing the second electrode layer 40 may also be entirely coated with the black light absorbing material.

Some embodiments of the present disclosure provide an electronic device, including the touch display panel according to any of the above-mentioned embodiments. The electronic device may be a product or component with touch and display functions, such as an electronic watch, a vehicle display device, etc.

Figure 14:
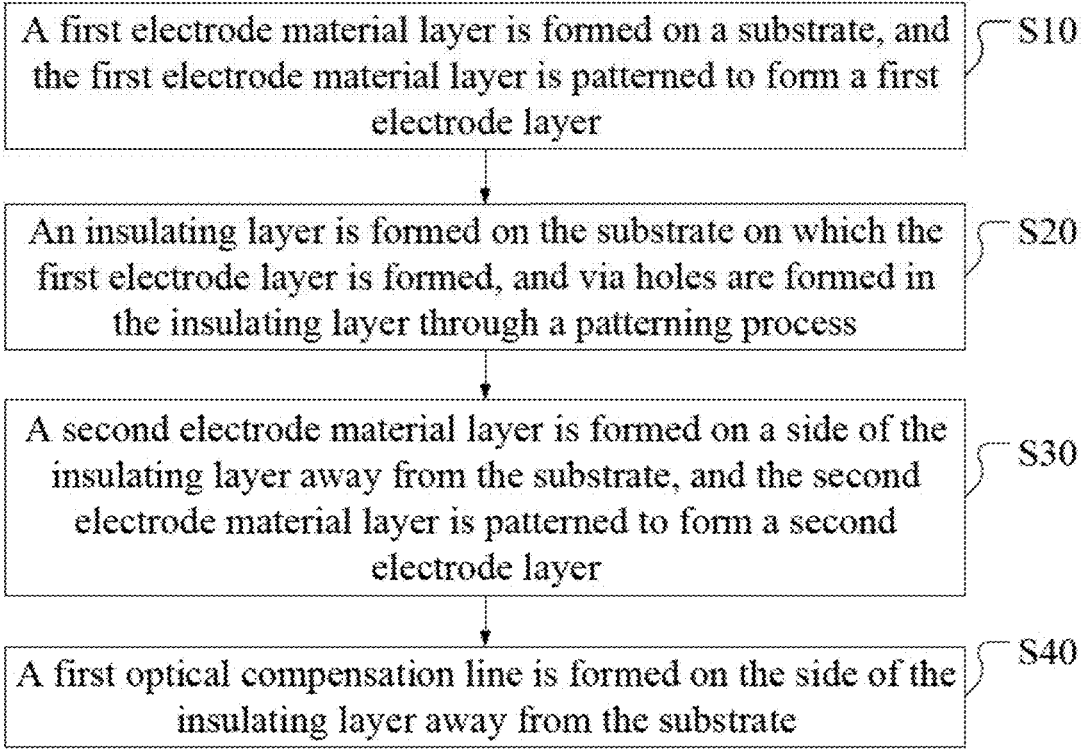
FIG. 14 shows a flowchart of a method of manufacturing a touch display panel according to some embodiments of the present disclosure.

Some embodiments of the present disclosure provide a method of manufacturing the touch display panel according to the above-mentioned embodiments. As shown in FIG. 14, the manufacturing method includes the steps S10 to S40.

In step S10, a first electrode material layer is formed on a substrate, and the first electrode material layer is patterned to form a first electrode layer including a bridge layer.

In step S20, an insulating layer is formed on the substrate on which the first electrode layer is formed, and via holes are formed in the insulating layer through a patterning process.

In step S30, a second electrode material layer is formed on a side of the insulating layer away from the substrate, and the second electrode material layer is patterned to form a second electrode layer including a first touch electrode and a second touch electrode. A first touch sub-electrode and a second touch sub-electrode of the second touch electrode are electrically connected to a bridge portion through the via holes, respectively. The first touch electrode and the second touch electrode are both metal mesh structures and electrically insulated from each other.

In step S40, a first optical compensation line is formed on the side of the insulating layer away from the substrate, the first optical compensation line is formed between the first touch electrode and the second touch electrode to connect a disconnection between the two. The first touch electrode, the second touch electrode and the first optical compensation line form a continuous mesh structure.

In some embodiments, before forming the first electrode material layer, the manufacturing method further includes forming a display pixel layer, an encapsulation layer, a buffer layer, etc. on the substrate in sequence.

In some embodiments, the manufacturing method further includes roughening or blackening surfaces of the first electrode layer and the second electrode layer facing each other. The roughening treatment includes particle bombardment, laser bombardment or patterning process, etc., and the blackening treatment includes coating black light absorbing material, etc.

In some embodiments, the second electrode layer formed in the step S30 includes a floating electrode layer. The first touch electrode, the second touch electrode and the floating electrode are metal mesh structures, and they are electrically insulated from each other. In the step S40, an optical compensation line is formed on the side of the insulating layer away from the substrate, the first optical compensation line is formed between the first touch electrode, the second touch electrode and the floating electrode to connect a disconnection between them, so that the first touch electrode, the second touch electrode, the floating electrode and the optical compensation line form a continuous mesh structure.

In some embodiments, after the step S40, the manufacturing method further includes forming a protective layer covering an entire substrate, and the protective layer may include an organic or inorganic material.

The above description is merely a preferred embodiment of the present disclosure and an explanation of the technical principles employed. Those skilled in the art should understand that the scope of the invention involved in the present disclosure is not limited to the technical solutions formed by the specific combination of the above-mentioned technical features, and should also cover other technical solutions formed by any combination of the above-mentioned technical features or their equivalent features without departing from the inventive concept, for example, the technical solution formed by replacing the above-mentioned features and (but not limited to) the technical features with similar functions disclosed in the present disclosure with each other.

What is claimed is:

1. A touch display panel, comprising:
   a substrate;
   a first touch electrode disposed on the substrate, the first touch electrode having a metal mesh structure; and
   a second touch electrode disposed on the substrate and adjacent to the first touch electrode, the second touch electrode having a metal mesh structure,
   wherein the first touch electrode comprises a first metal line extending toward the second touch electrode, the second touch electrode comprises a second metal line extending toward the first touch electrode, the first metal line and the second metal line are disposed collinearly and spaced apart from each other, and
   wherein the touch display panel further comprises an insulated first optical compensation line disposed between the first metal line and the second metal line, the first optical compensation line is disposed collinearly with the first metal line and the second metal line, and both end portions of the first optical compensation line abut against the first metal line and the second metal line, respectively.

2. The touch display panel according to claim 1, wherein the first touch electrode and the second touch electrode are made of a same metal material and disposed in a same layer, and an optical property of a material of the first optical compensation line is substantially the same as an optical property of the metal material.

3. The touch display panel according to claim 1, wherein a width of the first optical compensation line, a width of the first metal line, and a width of the second metal line are equal to each other.

4. The touch display panel according to claim 1, wherein a thickness of the first optical compensation line, a thickness of the first metal line, and a thickness of the second metal line are equal to each other.

5. The touch display panel according to claim 1, further comprising:
   a floating electrode disposed on the substrate and adjacent to the first touch electrode, the floating electrode having a metal mesh structure,
   wherein the first touch electrode comprises a third metal line extending toward the floating electrode, the floating electrode comprises a fourth metal line extending toward the first touch electrode, the third metal line and the fourth metal line are disposed collinearly and spaced apart from each other by a predetermined distance, and
   wherein the touch display panel further comprises an insulated second optical compensation line disposed between the third metal line and the fourth metal line, the second optical compensation line is disposed collinearly with the third metal line and the fourth metal line, and both end portions of the second optical compensation line abut against the third metal line and the fourth metal line, respectively.

6. The touch display panel according to claim 5, wherein the floating electrode is adjacent to the second touch electrode, the second touch electrode comprises a fifth metal line extending toward the floating electrode, the floating electrode comprises a sixth metal line extending toward the second touch electrode, the fifth metal line and the sixth metal line are disposed collinearly and spaced apart from each other by a predetermined distance, and
   wherein the touch display panel further comprises an insulated third optical compensation line disposed between the fifth metal line and the sixth metal line, the third optical compensation line is disposed collinearly with the fifth metal line and the sixth metal line, and both end portions of the third optical compensation line abut against the fifth metal line and the sixth metal line, respectively.

7. The touch display panel according to claim 1, wherein the first touch electrode comprises:
a first sub-portion extending in a first direction;
a plurality of first finger-shaped portions extending away from the first sub-portion in a second direction intersecting the first direction from the first sub-portion, and the plurality of first finger-shaped portions being located on one side of the first sub-portion; and
a plurality of second finger-shaped portions extending away from the first sub-portion in the second direction from the first sub-portion, and the plurality of second finger-shaped portions being located on the other side of the first sub-portion, and
wherein the second touch electrode comprises a first touch sub-electrode and a second touch sub-electrode, and the first touch sub-electrode comprises:
a second sub-portion extending in the first direction, the second sub-portion being located on one side of the first sub-portion; and
a plurality of third finger-shaped portions extending from the second sub-portion toward the first sub-portion in the second direction, and
the second touch sub-electrode comprises:
a third sub-portion extending in the first direction, the third sub-portion being located on the other side of the first sub-portion; and
a plurality of fourth finger-shaped portions extending from the third sub-portion toward the first sub-portion in the second direction, and
wherein the plurality of first finger-shaped portions and the plurality of third finger-shaped portions are alternately disposed in the first direction, and the plurality of second finger-shaped portions and the plurality of fourth finger-shaped portions are alternately disposed in the first direction.

8. The touch display panel according to claim 7, further comprising:
a bridge portion extending in the second direction and configured to electrically connect the first touch sub-portion and the second touch sub-portion,
wherein the bridge portion is located in a first electrode layer, the first touch electrode and the second touch electrode are located in a second electrode layer, and the first electrode layer and the second electrode layer are sequentially disposed away from the substrate.

9. The touch display panel according to claim 8, wherein the bridge portion comprises a first bridge sub-portion, a second bridge sub-portion and a third bridge sub-portion disposed sequentially in the second direction, and
wherein an orthographic projection of the first bridge sub-portion on the substrate falls within an orthographic projection of at least one of the plurality of third finger-shaped portions on the substrate;
an orthographic projection of the second bridge sub-portion on the substrate partially overlaps an orthographic projection of the first sub-portion on the substrate; and
an orthographic projection of the third bridge sub-portion on the substrate falls within an orthographic projection of at least one of the plurality of fourth finger-shaped portions on the substrate.

10. The touch display panel according to claim 8, wherein the second electrode layer has a first surface facing the first electrode layer, the first electrode layer has a second surface facing the second electrode layer, an insulating layer is sandwiched between the first surface and the second surface, and an orthographic projection of the first electrode layer on the substrate has an overlapping region with an orthographic projection of the second electrode layer on the substrate.

11. The touch display panel according to claim 10, wherein in the overlapping region, at least one of the first surface and the second surface is a rough surface.

12. The touch display panel according to claim 10, wherein in the overlapping region, at least one of the first surface and the second surface is coated with a black light absorbing material.

13. The touch display panel according to claim 8, further comprising:
a display pixel layer disposed on the substrate; and
an encapsulation layer disposed on a side of the display pixel layer away from the substrate, and configured to cover the display pixel layer,
wherein the first electrode layer and the second electrode layer are sequentially disposed away from the encapsulation layer.

14. The touch display panel according to claim 7, wherein the first touch electrode and the second touch electrode form a touch unit, and the touch display panel comprises a plurality of touch units arranged in an array, and
wherein for two touch units adjacent in the first direction, first sub-portions of first touch electrodes of the two touch units are electrically connected to each other; and
for two touch units adjacent in the second direction, a second sub-portion of a first touch sub-electrode of a second touch electrode of one of the two touch units is electrically connected to a third sub-portion of a second touch sub-electrode of a second touch electrode of the other of the two touch units.

15. An electronic device comprising the touch display panel according to claim 1.

16. The touch display panel according to claim 2, wherein a width of the first optical compensation line, a width of the first metal line, and a width of the second metal line are equal to each other.

17. The touch display panel according to claim 2, wherein a thickness of the first optical compensation line, a thickness of the first metal line, and a thickness of the second metal line are equal to each other.

18. The touch display panel according to claim 2, further comprising:
a floating electrode disposed on the substrate and adjacent to the first touch electrode, the floating electrode having a metal mesh structure,
wherein the first touch electrode comprises a third metal line extending toward the floating electrode, the floating electrode comprises a fourth metal line extending toward the first touch electrode, the third metal line and the fourth metal line are disposed collinearly and spaced apart from each other by a predetermined distance, and
wherein the touch display panel further comprises an insulated second optical compensation line disposed between the third metal line and the fourth metal line, the second optical compensation line is disposed collinearly with the third metal line and the fourth metal line, and both end portions of the second optical compensation line abut against the third metal line and the fourth metal line, respectively.

19. The touch display panel according to claim 2, wherein the first touch electrode comprises:

a first sub-portion extending in a first direction;

a plurality of first finger-shaped portions extending away from the first sub-portion in a second direction intersecting the first direction from the first sub-portion, and the plurality of first finger-shaped portions being located on one side of the first sub-portion; and a plurality of second finger-shaped portions extending away from the first sub-portion in the second direction from the first sub-portion, and the plurality of second finger-shaped portions being located on the other side of the first sub-portion, and wherein the second touch electrode comprises a first touch sub-electrode and a second touch sub-electrode, and the first touch sub-electrode comprises:

a second sub-portion extending in the first direction, the second sub-portion being located on one side of the first sub-portion; and a plurality of third finger-shaped portions extending from the second sub-portion toward the first sub-portion in the second direction, and the second touch sub-electrode comprises:

a third sub-portion extending in the first direction, the third sub-portion being located on the other side of the first sub-portion; and a plurality of fourth finger-shaped portions extending from the third sub-portion toward the first sub-portion in the second direction, and wherein the plurality of first finger-shaped portions and the plurality of third finger-shaped portions are alternately disposed in the first direction, and the plurality of second finger-shaped portions and the plurality of fourth finger-shaped portions are alternately disposed in the first direction.

20. The touch display panel according to claim 9, wherein the second electrode layer has a first surface facing the first electrode layer, the first electrode layer has a second surface facing the second electrode layer, an insulating layer is sandwiched between the first surface and the second surface, and an orthographic projection of the first electrode layer on the substrate has an overlapping region with an orthographic projection of the second electrode layer on the substrate.

* * * * *